United States Patent [19]

Kawana

[11] Patent Number: 4,746,788
[45] Date of Patent: May 24, 1988

[54] IDENTIFICATION SYSTEM FOR AUTHENTICATING BOTH IC CARD AND TERMINAL

[75] Inventor: Shigeyuki Kawana, Tokyo, Japan

[73] Assignee: Casio Computer Co., Ltd., Tokyo, Japan

[21] Appl. No.: 907,677

[22] Filed: Sep. 15, 1986

[30] Foreign Application Priority Data

Sep. 17, 1985 [JP] Japan ................... 60-204696

[51] Int. Cl.[4] ........................................... G06F 15/20
[52] U.S. Cl. ................................ 235/380; 235/492; 340/825.34
[58] Field of Search ............... 235/380, 382, 492, 379, 235/375, 381; 340/825.34, 825.33

[56] References Cited

U.S. PATENT DOCUMENTS

| | | | |
|---|---|---|---|
| 3,760,159 | 9/1973 | Davis et al. | 235/454 X |
| 4,214,230 | 7/1980 | Fak et al. | 235/380 |
| 4,317,957 | 3/1982 | Sendrow | 340/825.34 |
| 4,328,414 | 5/1982 | Atalla | 235/380 |
| 4,453,074 | 6/1984 | Weinstein | 235/380 |
| 4,630,201 | 12/1986 | White | 235/380 X |
| 4,650,975 | 3/1987 | Kitchener | 235/380 X |

*Primary Examiner*—Philip H. Leung
*Attorney, Agent, or Firm*—Frishauf, Holtz, Goodman & Woodward

[57] ABSTRACT

Data unique to an IC card and encrypted unique data obtained by encrypting the unique data are previously stored in the IC card. The encrypted unique data is decrypted in an IC card terminal, to obtain decrypted data and the decrypted data and unique data stored in the IC card are compared on the side of the IC card and also in the IC card terminal, whereby the authenticity of both the IC card and IC card terminal is confirmed.

6 Claims, 4 Drawing Sheets

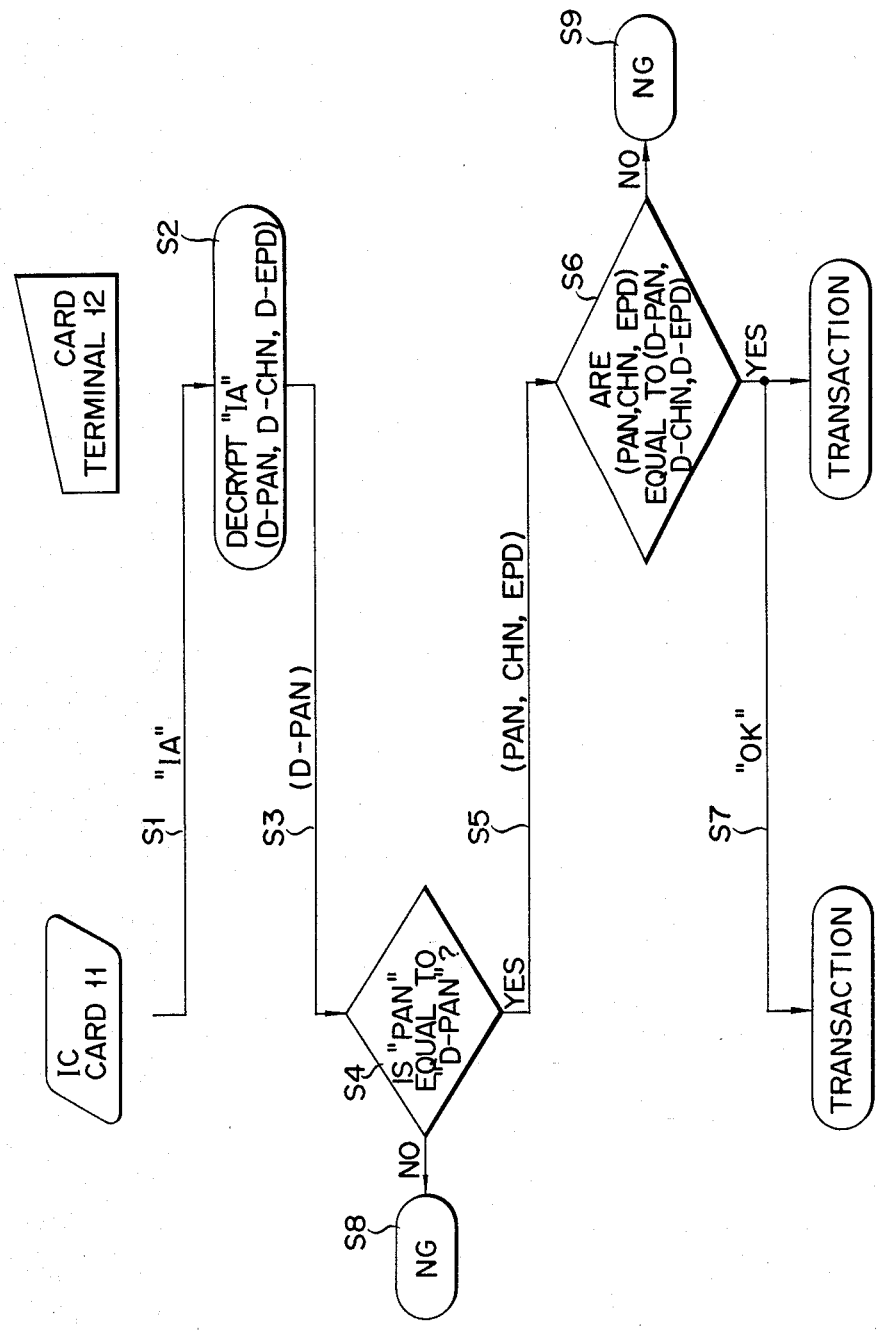
F I G. 4

IDENTIFICATION SYSTEM FOR AUTHENTICATING BOTH IC CARD AND TERMINAL

BACKGROUND OF THE INVENTION

1. Field of the Invention

The present invention relates to an identification system for identifying the identities between an IC card issued such as a cash card or credit card and an IC card terminal when the IC card is loaded in the IC card terminal installed in a shop or the like.

2. Description of the Prior Art

Recently, there have been a variety of cards issued by credit card firms or the like, with which commercial commodities can be purchased. As such cards, plastic cards, embossing cards, cards having magnetic stripes, etc. are used. Such cards can be easily forged for illegal use. To prevent this problem, there has recently been developed an information card or so-called IC card, in which an IC module with a personal identification number (PIN) or the like stored therein is embedded in a thin card so that the PIN cannot be readily read out from the outside. This IC card can be difficult to forge and has excellent security. Further, it can store large quantities of information. When the IC card is used for a commercial transaction, it is loaded in an IC card terminal installed at a bank, a shop, etc., and the PIN and other data are input for the identification of the card and cardholder before a predetermined processing is executed.

However, in the IC card system utilizing the IC card and IC card terminal, the PIN data of the cardholder is input from a keyboard of the card terminal in the shop. Therefore, the PIN data input operation is liable to be watched surreptitiously by, for instance, staff members, or other customers in the shop. Also, it is possible that the input PIN data can be read out surreptitiously by providing some surreptitious use of the card terminal itself. Therefore, the IC card has potential security problems during actual transactions. The surreptitious observation of the PIN data input operation can be avoided if care is taken by the person who inputs the secret data. However, if means for surreptitiously reading out data is provided in the card terminal itself, there is no effective countermeasure by the cardholder. Further, when the IC card is forged, there is no countermeasure at all within the card terminal. Therefore, when an IC card is loaded in an IC card terminal, it is necessary to confirm the validity of both the card and the IC card terminal before the PIN data input operation, i.e., in an initial state after loading of or electric communicating with the IC card.

SUMMARY OF THE INVENTION

The invention has been accomplished in view of the above conventional drawbacks, and has therefore an object of providing an identification system, which can avoid illegal card transactions due to forging of an IC card, tampering with an IC card terminal, or using a counterfeit terminal.

The object and other features of the invention can be achieved by providing an identification system comprising:

IC card means;

IC card terminal means capable of electrically communicating with the IC card means when the IC card means is loaded thereon;

said IC card means including first memory means for storing at least data unique to said IC card means and encrypted unique data obtained by encrypting said unique data;

said IC card terminal means including decrypting means for decrypting said encrypted unique data stored in said first memory means to derive decrypted unique data;

said IC card means further including first comparing means for comparing said unique data stored in said first memory means with said decrypted unique data sent from said IC card terminal means so as to judge whether said unique data is coincident with said decrypted unique data; and said IC card terminal further including second comparing means for comparing said unique data stored in said first memory means and sent from said IC card means with said decrypted unique data so as to judge whether said unique data is coincident with said decrypted unique data, thereby confirming identities of both said IC card means and said IC card terminal means.

BRIEF DESCRIPTION OF THE DRAWINGS

For a better understanding of the above object and the features of the present invention, reference is made to the following detailed description of the invention to be read in conjunction with the accompanying drawings, in which:

FIG. 4 is a flow chart illustrating an operation of confirming the authenticity of the IC card and IC card terminal in the IC card system.

DETAILED DESCRIPTION OF THE PREFERRED EMBODIMENTS

An embodiment of this invention will now be described with reference to the accompanying drawings.

IC CARD AND CARD TERMINAL

Figure 1:
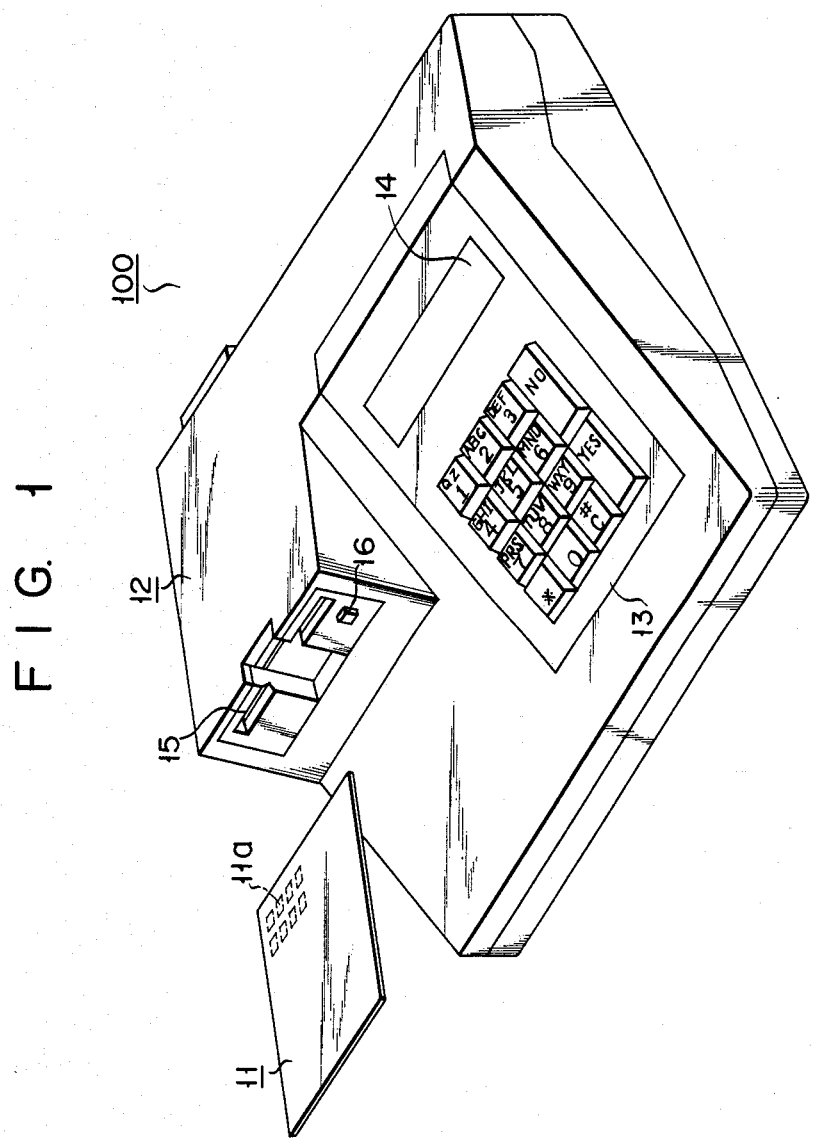
FIG. 1 is a perspective view showing an IC card and an IC card terminal used in the identification system according to an embodiment of the invention.

FIG. 1 shows a perspective view of IC card 11 and IC card terminal (external unit) 12 in an IC card system 100 according to the invention. The IC card terminal 12 has keyboard 13, display 14 and card inlet 15 for permitting electric connection of terminal 12 to connector section 11a of IC card 11. These terminal parts are provided on top of a terminal housing. Card inlet 15 is provided in a card inlet panel, which is provided with eject push-button 16 for taking out the IC card.

CIRCUIT ARRANGEMENT OF IC CARD

Figure 2:
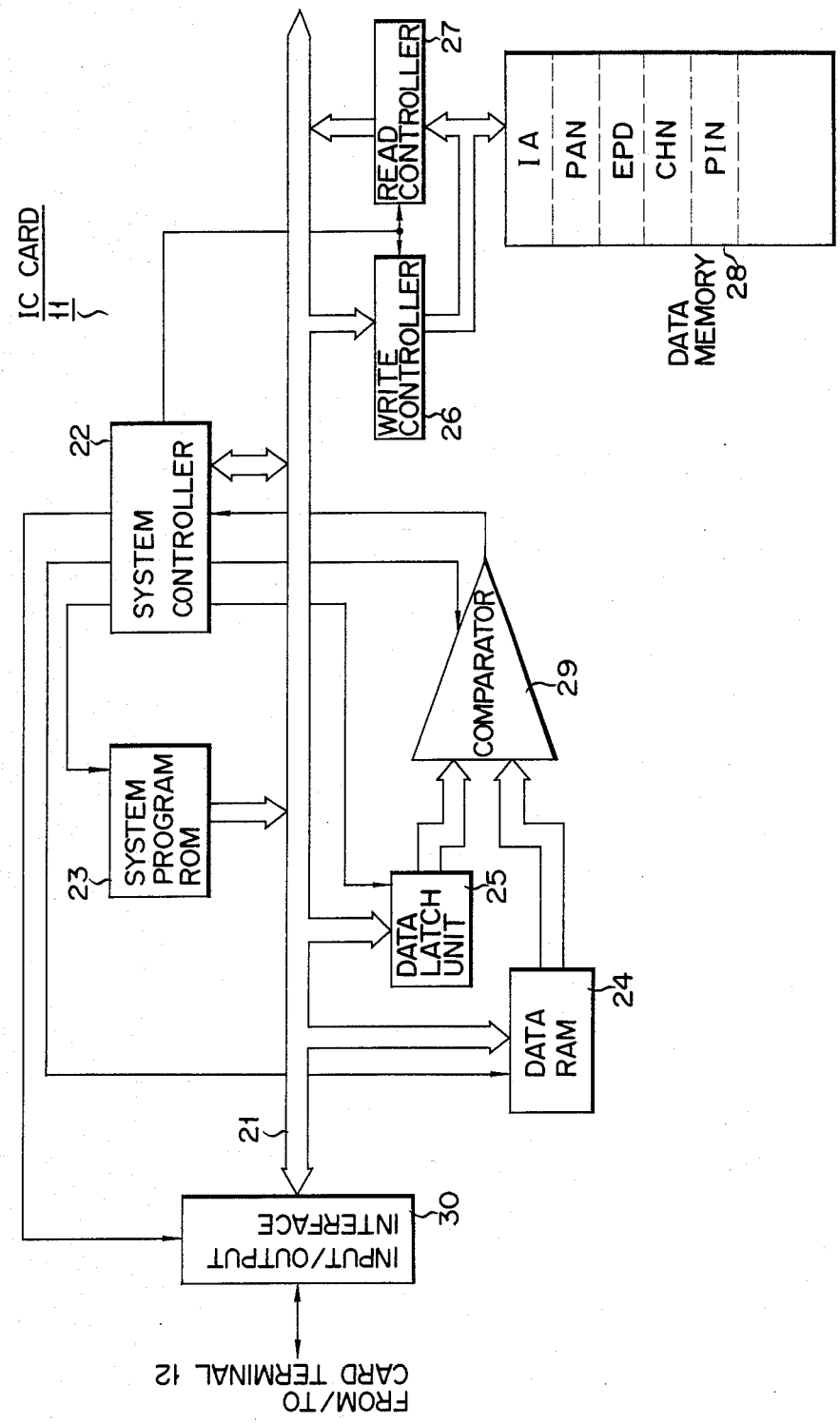
FIG. 2 is a block diagram showing the circuitry of the IC card shown in FIG. 1.

FIG. 2 shows the circuit arrangement of IC card 11 illustrated in FIG. 1. A data bus line 21 is connected to system controller 22 and system program ROM 23.

Data RAM 24 and data latch unit 25 are connected to data bus line 21, and also data memory 28 are connected to data bus line 21 via parallel-connected write controller 26 and read controller 27. System controller 22 supplies control commands to these circuit elements.

Data memory 28 stores encrypted data unique to card 11, i.e., "IA" (issuer authenticator). This specific single data IA is produced by encrypting three sets of data, "PAN", "EPD" and "CHN", and is registered in both the card issuer and the IC card. Data memory 28 further stores "PAN" (primary account number), "EPD" (expiration date of card) and "CHN" (cardholder's name). In data memory 28, data "PIN" (personal identification number) is also stored, which is entered by the cardholder personally at the time of issuance of card 11. Data stored in data memory 28 is stored and read out under control of controlling commands derived from system controller 22 for controlling the write controller 26 and read controller 27. Data read from data memory 28 through read controller 27 is written in data storing RAM 24. Data supplied from card terminal 12 is latched in data latch unit 25. Data latch unit 25 and data RAM 24 are connected to comparator 29. Comparator 29 supplies comparison results to system controller 22. System controller 22 supplies either an "OK" message or a "NG (no good)" message to data bus line 21 depending on whether the comparison result of comparator 29 is a coincidence output. Input/output interface 30 is connected to data bus line 21 for connection to card terminal 12.

CIRCUIT ARRANGEMENT OF CARD TERMINAL

Figure 3:
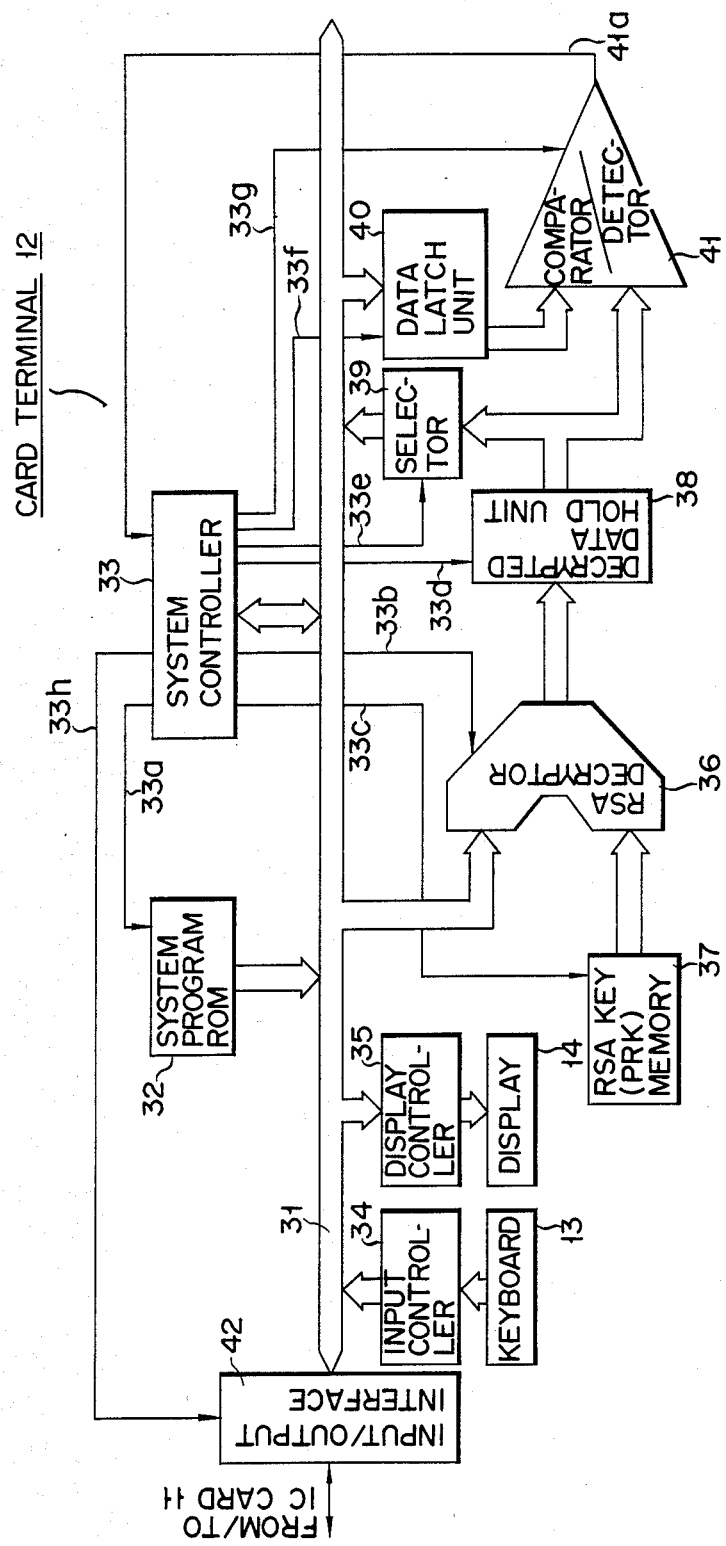
FIG. 3 is a schematic block diagram showing the circuitry of the IC card terminal shown in FIG. 1.

FIG. 3 shows the circuit arrangement of IC card terminal 12.

In this figure, data bus line 31 is employed to connect system program ROM 32, system controller 33, input controller 34 for controlling keyboard 13, display controller 35 for controlling display unit 14 and RSA decryptor 36. RSA decryptor 36 decrypts data on the basis of an "RSA" algorithm. More specifically, RSA 36 decrypts the encrypted data "IA" read out and supplied form data memory 28 of IC card 11 according to a decrypting key code (PRK) stored in RSA key code memory 37 and supplies the decrypted data to decrypted data hold unit 38. Selector 39 is connected to decrypted data hold unit 38 via data bus line 31 so that a plurality of decrypted data can be selectively extracted.

In the code system based on the above-described "RSA" algorithm, data of interest is encrypted according to a public key code (PUK) and decrypted according to a private key code (PRK). The PUK and PRK are key codes selected on the basis of the "RSA" algorithm such that the key code selection is effected in a one-to-one corresponding relationship by a predetermined one-way function. In the code system based on the "RSA" algorithm, the data encrypted by the PUK (i.e., "IA" in this embodiment) is extremely difficult to be decrypted by the same PUK, but can be decrypted only with the PRK in one-to-one corresponding relationship by the one-way function. The code system based on this "RSA" algorithm is described in detail in "CRYPTOGRAPHY" by Carl H. Meyer and Stephen M. Matyas issued in 1982 by John Wiley & Sons, Inc.

Data latch unit 40 is connected to data bus line 31. The three sets of data "PAN", "CHN" and "EPD" are latched in data latch unit 40, which are read out and supplied from data memory 28 in IC card 11. Data latch unit 40 and decrypted data hold unit 38 are connected to comparator/detector 41. The output from comparator/detector 41 is supplied through control line 41a to system controller 33. Input/output interface 42 is connected to data bus line 31 for connection to IC card 11.

System program ROM 32, RSA decryptor 36, RSA key memory 37, decrypted data hold unit 38, selector 39, data latch unit 40 and comparator/detector 41 are connected to system controller 33 through control lines 33a to 33g, and their operations are controlled by controlling signals supplied through these control lines 33a to 33g.

IDENTIFICATION

A description will now be made of identification operation of the system 100 for confirming identities between the IC card 11 and the card terminal 12 with reference to the flowchart shown in FIG. 4.

As seen from FIG. 4, a flowchart of the card operation is shown in contrast with a flowchart of operation in IC card terminal 12. When the IC cardholder loads IC card 11 in card terminal 12 installed in a shop, for instance, through card inlet 15, input/output interface 30 of IC card 11 and input/output interface 42 of terminal 12 are interconnected (see FIGS. 1, 2 and 3). Then, the system proceeds in step S1, in which encrypted data "IA" is read out from data memory 28 in IC card 11 and transferred to card terminal 12 via interfaces 30 and 42. In subsequent step S2, the encrypted data "IA" transferred to terminal 12 is subjected to decryption in RSA decryptor 36 based upon the decrypting key code "PRK" stored in RSA key code memory 37. Data "D-PAN", "D-CHN" and "D-EPD" decrypted by RSA decryptor 36 are transferred to and stored in decrypted data hold unit 38. In step S3, only data "D-PAN" (decrypted personal account number) among the three decrypted data is extracted by selector 39 to be transferred to IC card 11. In IC card 11, data "D-PAN" transferred from card terminal 12 is latched in data latch unit 25, and data "PAN" is read out from data memory 28 through read controller 27 and stored in data RAM 24. In subsequent step S4, comparator 29 compares decrypted data "D-PAN" latched in data latch section 25 with the data "PAN" derived from data ROM 24. Then, if comparator 29 determines in step S4 that the data "D-PAN" decrypted in card terminal 12 and data "PAN" previously stored in IC card 11 are coincident with each other, it is confirmed that IC card terminal 12 to which IC card 11 is being connected is authentic. Thereafter the system proceeds to step S5, in which IC card 11 reads out the three sets of data "PAN", "CHN" and "EPD" from data memory 28 and transfers them to card terminal 12. These data "PAN", "CHN" and "EPD" transferred from IC card 11 are latched in data latch unit 40 of card terminal 12. In subsequent step S6, comparator/detector 41 compares the three sets of decrypted data "D-PAN", "D-CHN" and "D-EPD" stored in decrypted data hold unit 38 with the other data "PAN", "CHN" and "EPD" latched in data latch unit 40. If comparator/detector 41 determines in step S6 that the data "D-PAN", "D-CHN" and "D-EPD" decrypted in the card terminal 12 are coincident with data "PAN", "CHN" and "EPD" previously stored in IC card 11, it is determined that IC card 11 being loaded to terminal 12 is authentic. Then the system advances to step S7, in which "OK" signal is transmitted to IC card 11 from card terminal 12, and also an "OK message" is displayed to display unit 14 of terminal 12, thereby displaying the consent for possibility of transaction with IC card 11. It is thus confirmed that the present IC card 11 is an authentic IC card officially issued by a credit firm, and it is also confirmed that the IC card terminal 12, to which this IC card 11 is being loaded, is also authentic. After confirmation of the authenticity between IC card 11 and IC card terminal 12 according to the invention, the cardholder is identified by a normal "PIN" check before a transaction with the IC card can be executed.

If in step S4, decryption data "D-PAN" decrypted in the card terminal 12 and data "PAN" previously stored in IC card 11 are not coincident with each other, IC card terminal 12, to which the present IC card 11 is being loaded, is highly likely to be unauthentic. Then the system goes to step S8, where card data transfer operation with card terminal 12 is immediately interrupted. Consequently, if IC card terminal 12 is unauthentic, or altered, this can be recognized before the actual transaction starts with the IC card, thus preventing possible problems.

Further, if in step S6, three sets of data "D-PAN", "D-CHN" and "D-EPD" decrypted in the card terminal 12 are not coincident with three sets of data "PAN", "CHN" and "EPD" previously stored in IC card 11, then it is highly likely that the IC card 11 being loaded to terminal 12 is unauthentic, so that data exchange with IC card 11 is inhibited in step S9. Thus, if the IC card 11 connected to terminal 12 is unauthentic, e.g., a forged one, such a fact can be recognized before the actual transaction with IC card commences, with the result that possible transaction trouble can be avoided.

It should be understood from the foregoing operations that the encrypted data "IA" previously stored in data memory 28 is utilized to judge the identity of the card terminal in the IC card, whereas three sets of data "PAN", "EPD" and "CHN" are used to judge the identification of the IC card in the card terminal.

Although the foregoing has been a description and illustration of specific embodiments of the invention, various modifications and changes thereto can be made by persons skilled in the art without departing from the scope of the invention.

In the above embodiment the "RSA" algorithm has been adopted for the encrypting system, but for example, it is also possible to introduce a "Data Encryption System" (DES).

Further, the unique data "PAN", "CHN" and "EPD" are not limited, but any other specific data may be employed.

While the invention has been described in the foregoing, both the data (PAN, CHN, EPD) unique to the IC card and the encrypted unique data (IA) obtained by encrypting the above data are previously stored in the IC card, the encrypted unique data is decrypted in the IC card terminal, and the decrypted data and unique data previously stored in the IC card are compared in both the IC card and the IC card terminal to confirm the authenticity or identities of both the IC card and the IC card terminal. Thus, it is possible to prevent illegal card transactions with, for instance, a forged IC card or a counterfeit or tempered IC card terminal.

Moreover, since the IC card does not require any encrypting circuit but merely stores the unique data and the data obtained by encrypting this unique data, it is possible to simplify the circuitry of the IC card and manufacture a low-cost IC card.

What is claimed is:

1. An identification system comprising:
   IC card means;
   IC card terminal means capable of electrically communicating with the IC card means when the IC card means is loaded thereon;
   said IC card means including first memory means for storing at least data unique to said IC card means and encrypted unique data obtained by encrypting said unique data;
   said IC card terminal means including decrypting means for decrypting said encrypted unique data stored in said first memory means to derive decrypted unique data;
   said IC card means further including first comparing means for comparing said decrypted unique data sent from said IC card terminal means with said unique data stored in said first memory means so as to judge whether said unique data is coincident with said decrypted unique data; and
   said IC card terminal further including second comparing means for comparing said decrypted unique data with said unique data stored in said first memory means and sent from said IC card means so as to judge whether said unique data is coincident with said decrypted unique data, thereby confirming identities of both said IC card means and said IC card terminal means.

2. An identification system as claimed in claim 1, wherein, when the result of comparison by at least one of said first and second comparing means is non-coincident, subsequent communication between said IC card means and said IC card terminal means is interrupted.

3. An identification system as claimed in claim 2, wherein said IC card terminal means further includes second memory means for storing key information for decryption, said decrypting means of said IC card terminal means decrypting said encrypted unique data stored in said first memory means on the basis of a "RSA" algorithm using said key information for decryption.

4. An identification system as claimed in claim 2, wherein said unique data and encrypted unique data stored in said first memory means of said IC card means each comprise a plurality of different data information;
   said IC card means includes first selecting means for selecting at least one of said plurality of unique data;
   said IC card terminal means includes second selecting means for selecting at least one of a plurality of decrypted data decrypted by said decrypting means; and
   said first comparing means compares said unique data with said decrypted data selected by said first and second selecting means so as to judge coincidence between said data.

5. An identification system as claimed in claim 4, wherein, when the result of comparison by said first comparing means in said IC card means is coincident, said second comparing means of said IC card terminal means compares all of the unique data stored in said first memory means with all of the decrypted data decrypted by said decrypting means.

6. An identification system as claimed in claim 5, wherein said unique data include data "PAN", "CHN" and "EPD", and said decrypted data is obtained by encrypting said data "PAN", "CHN" and "EPD" on the basis of an RSA algorithm.

* * * * *